Sept. 6, 1960  F. W. HENNING, JR., ET AL  2,951,341
FUEL INJECTION SYSTEM FOR AN AIRCRAFT ENGINE
Filed Sept. 19, 1956

WITNESSES

INVENTORS
Charles T. Levinsky &
Frederick W. Henning, Jr.
BY
ATTORNEY

2,951,341

United States Patent Office

Patented Sept. 6, 1960

2,951,341

FUEL INJECTION SYSTEM FOR AN AIRCRAFT ENGINE

Frederick W. Henning, Jr., Merriam, Kans., and Charles T. Levinsky, Alameda, Calif., assignors to Westinghouse Electric Corporation, East Pittsburgh, Pa., a corporation of Pennsylvania Filed Sept. 19, 1956, Ser. No. 611,810

4 Claims. (Cl. 60—39.74)

This invention relates to fuel combustion apparatus, more particularly to fuel supply mechanism therefor, and has for an object to provide improved apparatus of this type.

In aviation engines, particularly gas turbine engines, afterburners are employed for augmenting the propulsive thrust of the engine. Since the trend in present aircraft design is to permit flight at constantly increasing altitudes, it is essential that the afterburner operate reliably and efficiently at such high altitudes as well as at lower altitudes. The range of fuel flow required for the afterburner is so great that although adequate fuel pressure is available at the high fuel flow rates required at lower altitudes, very low fuel pressures result at the low fuel flow rates required at high altitudes. This causes vapor lock in the fuel manifold and inadequate atomization at high altitudes with attendant decreased combustion efficiency, stability and reliability.

In view of the above, it is another object of the invention to provide an afterburner fuel system having high efficiency, stability and improved temperature distribution characteristics at high altitudes as well as at low altitudes.

A further object of the invention is to provide an afterburner fuel system provided with a plurality of fuel injection manifolds and having means responsive to decrease in fuel pressure for interrupting fuel flow through at least one of said manifolds.

It is yet a further object of the invention to arrange the fuel manifolds, in an afterburner fuel system of the above type, in such a manner that the fuel spray pattern or plume is substantially the same whether fuel is being injected through either one or both manifolds.

In accordance with the invention, a first fuel injection manifold having a plurality of fuel spray orifices or openings and a second fuel injection manifold having a plurality of fuel spray openings are mounted back-to-back within a tubular combustion chamber with their spray openings facing in such a manner that the fuel spray pattern is substantially constant whether one or both manifolds are spraying fuel into the chamber. The two manifolds are preferably connected by branch conduits to a fuel metering control mechanism, so that the fuel is injected by both manifolds into the combustion chamber at the same pressure. A pressure responsive valve of the type which is closed at low pressure and opens as the pressure is increased, is interposed in the conduit to the second fuel manifold.

In operation, at low and medium elevations the fuel is delivered by the fuel metering control to the fuel manifolds at a sufficiently high pressure to maintain the pressure responsive valve open. Hence, both manifolds are rendered effective to spray fuel into the combustion chamber. However, at increasingly higher altitudes, as the fuel requirements to the after burner diminish and fuel at reduced pressure is supplied by the fuel control, the pressure responsive valve will close, thereby interrupting flow of fuel through the second fuel manifold.

Although the fuel manifolds may be arranged in various ways to operate jointly or separately without altering the spray pattern of the injected fuel, in the illustrated embodiment the spray openings in the first manifold are disposed in a manner to spray fuel in a downstream direction relative to flow of combustion gases while the spray openings in the second manifold are disposed in a manner to spray fuel in the opposite direction.

These and other objects are effected by the invention as will be apparent from the following description and claims taken in connection with the accompanying drawings, forming a part of this application, in which:

Figure 1:
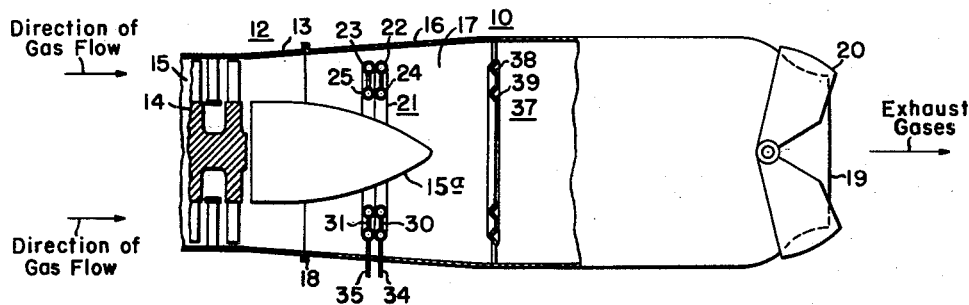
Fig. 1 is a fragmentary axial sectional view, schematically illustrating the rear portion of an aviation jet engine equipped with an afterburner made in accordance with the present invention.

Referring to the drawing in detail, especially Fig. 1, there is shown an afterburner 10 attached to a typical turbo-jet engine 12. Since the turbo-jet engine forms no part of the invention and may be of any desired type, only the rear portion has been shown including an engine casing 13 wherein is disposed an axial flow turbine 14 driven by hot combustion gases and air flowing therethrough along an annular passageway 15. Also, a suitable axially disposed fairing cone 15a may be provided for diffusing the gases after expansion in the turbine 14.

The afterburner 10, as illustrated, comprises an elongated tubular shell 16 defining a combustion chamber 17 open at both ends and attached to the engine casing 13 at its upstream end by a flanged connection 18. The downstream end of the shell 16 terminates in an exhaust outlet 19 which may be provided with variable area nozzle structure of any desired type, for example, a pair of hinged eyelid members 20.

Fuel injecting or feeding structure 21 including an outer pair of downstream and upstream annular fuel manifolds 22 and 23, respectively, and an inner pair of downstream and upstream annular fuel manifolds 24 and 25, respectively, are concentrically supported within the afterburner shell 16 adjacent the upstream end thereof in any suitable manner (not shown). The outer fuel manifolds 22 and 23 are disposed immediately adjacent each other, preferably in abutting back-to-back relationship. Similarly, the inner fuel manifolds 24 and 25 are disposed in abutting back-to-back relationship.

Figure 2:
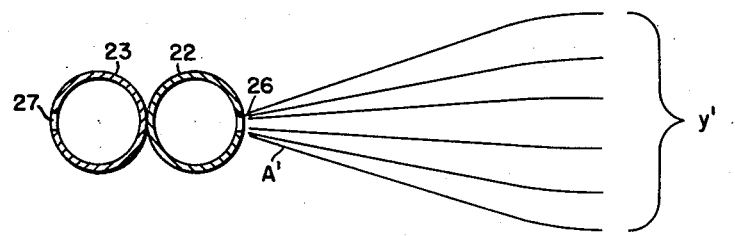
Fig. 2 is a diagrammatic fragmentary cross-sectional view of the fuel injection manifolds illustrating the fuel spray pattern attained at high altitude operation.
Figure 3:
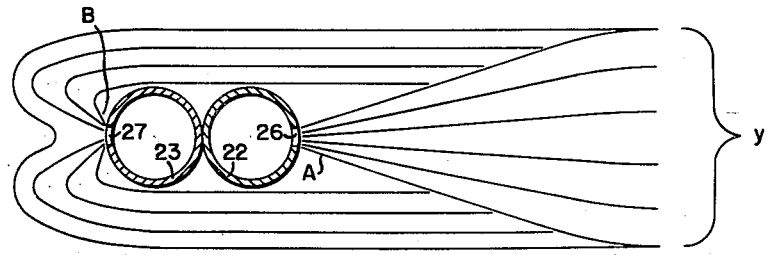
Fig. 3 is a cross-sectional view similar to Fig. 2 but illustrating the fuel spray pattern attained at lower altitude operation.

As best seen in Figs. 2 and 3, the outer downstream manifold 22 is provided with an annular group of spaced fuel spray orifices 26 facing downstream with respect to direction of flow of gases in the afterburner shell 16, while the outer upstream manifold 23 is provided with a similar group of spaced fuel spray orifices 27 facing in upstream direction. The orifices 26 and 27 are disposed in concentric circles of equal radius and are in substantial axial alignment for a purpose which will subsequently be described.

In a similar manner, the inner fuel manifolds 24 and 25 (Fig. 4) are provided with downstream facing fuel spray orifices 28 and upstream facing fuel spray orifices 29, respectively, disposed in mutual axial alignment.

The outer and inner fuel manifolds 22 and 24 are connected to each other by a plurality of radial conduits 30. In similar manner, the outer and inner fuel manifolds 23 and 25 are connected to each other by a plurality of radial conduits 31.

Figure 4:
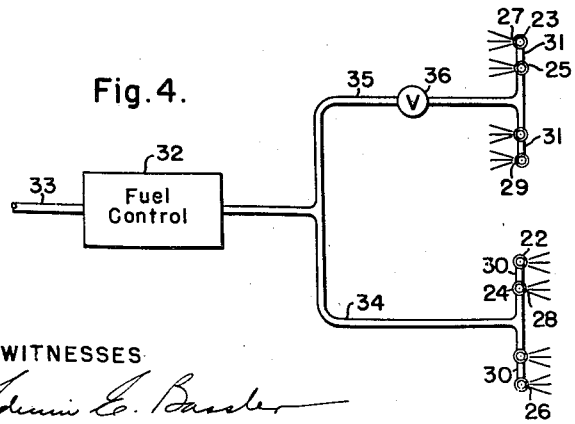
Fig. 4 is a diagrammatic view of the fuel supply system.

As shown in Fig. 4, the fuel supply system includes a fuel control mechanism 32 interposed in a conduit 33 connected to a fuel supply source (not shown) and controlling flow of fuel through a pair of branch conduits 34 and 35. The branch conduit 34 is in communication with the downstream fuel manifolds 22 and 24 while the branch conduit 35 is in communication with the upstream fuel manifolds 23 and 25.

Details of the fuel control mechanism 32 have not been shown, since it may be of any well known type which controls rate of fuel flow in accordance with altitude or barometric pressures. As known in the art, in order that optimum combustion conditions may be attained in the combustion chamber 17, control mechanisms of this type meter the fuel in such a manner that high rates of fuel flow are effected at low altitude and proportionately decreasing rates of fuel flow are effected as the altitude is increased. Thus, although the pressure of the fuel is adequate at low altitudes to provide the desired spray pattern to fuel admitted into the combustion chamber, at increased altitudes the resulting reduced fuel pressure is insufficient to maintain the proper spray pattern and prevent vapor lock in the manifolds.

Accordingly, a valve 36 responsive to fuel pressure in the branch conduit 35, is provided to control delivery of fuel to the upstream manifolds 23 and 25.

At a suitable distance downstream of the fuel feeding structure 21, flameholding structure 37 of any desired type may be provided. As illustrated, the flameholding structure 37 may comprise a plurality of concentric annular members 38 and 39 of V-shaped cross-section suitably connected to the afterburner shell 16.

During low altitude operation, the rate of fuel supplied by the fuel control mechanism 32 is sufficiently high, so that a fuel pressure is attained in the branch conduits 34 and 35 which is of sufficient magnitude to maintain the pressure responsive valve 36 in the open position. Hence, fuel is permitted to flow through the upstream fuel manifolds 23 and 25 as well as through the downstream fuel manifolds 22 and 24. Under such conditions, as illustrated in Fig. 4, fuel is sprayed into the combustion chamber 17 in upstream direction by the upstream manifolds 23 and 25 and in downstream direction by the downstream manifolds 22 and 24.

As illustrated in Fig. 3, fuel issuing through each of the orifices 26 in the downstream manifold 22 defines a spray cone A having a cross-sectional area indicated by the letter Y, while fuel issuing through each of the orifices 27 in the upstream manifold 23 defines a spray cone B. Since the spray cone B issues in upstream direction relative to direction of gas flow from the turbine 14 (Fig. 1) the spray cone B is opposed by the flow forces of the gas stream and swept downstream in such a manner that it merges and coincides with the spray cone A. Also, its cross-sectional area at the merging point is substantially the same as the cross-sectional area Y of the spray cone B.

Although not shown, it will be understood that the spray cones of the inner fuel manifolds 24 and 25 are substantially identical to the spray cones A and B.

At high altitude operation, the rate of fuel flow supplied by the fuel control mechanism 32 is reduced. Hence, the resulting fuel pressure attained in the branch conduits is accordingly reduced to a value insufficient to maintain the pressure responsive valve 36 in the open position. Accordingly, the valve 36 will close thereby interrupting flow of fuel to the upstream fuel manifolds 23 and 25 and permitting the entire quantity of fuel metered by the fuel control mechanism to be fed into the combustion chamber 17 through the downstream fuel manifolds 22 and 24. Since the number of active fuel spray orifices is thus reduced to half the number active at low altitude, a higher pressure is required to deliver the required fuel flow. The higher pressure provides more complete atomization and prevents vapor lock in fuel manifolds 22 and 24.

Referring to Fig. 2, wherein the outer fuel manifolds 22 and 23 are illustrated during such high altitude operating conditions, it will be seen that no fuel issues through the fuel orifices 27. However, the fuel issuing in downstream direction through each of the fuel orifices 26 forms a spray cone A' of substantially the same character as spray cone A (Fig. 3) and having the same cross-sectional area Y'.

Although not shown, it will be understood that during high altitude operation, the spray cones of the downstream fuel manifold 24 are substantially the same as the spray cones A'.

With the above described arrangement, the fuel pressure is maintained sufficiently high for proper atomization and to avoid vapor lock regardless of the fuel flow rate. Also, since the spray pattern is maintained substantially constant as illustrated in Figs. 3 and 2 during low altitude and high altitude conditions, respectively, the fuel distribution as sensed by the flame-holding device 37 is substantially constant.

The fuel spray cones from the upstream orifices 27 and 29 augment the fuel spray cones from the downstream orifices 26 and 28 with no change in fuel distribution at low altitude operation. Hence, highly efficient and stable fuel combustion is attained and temperature distribution problems are substantially obviated.

While the invention has been shown in but one form, it will be obvious to those skilled in the art that it is not so limited, but is susceptible of various changes and modifications without departing from the spirit thereof.

What is claimed is:

1. In combustion apparatus for an aircraft engine, tubular wall structure defining a combustion chamber having openings at opposite ends for flow of gases therethrough, fuel feeding structure including a first annular manifold and a second annular manifold of substantially equal diameters disposed adjacent each other and in mutual axial alignment, said first manifold being disposed upstream of said second manifold relative to the flow of said gases and having a plurality of fuel spray openings facing upstream, said second manifold having a plurality of fuel spray openings facing downstream, means including conduit structure for supplying fuel to said first and and second manifolds in metered quantity ranging from low to high rates of fuel flow, whereby the fuel pressure in said conduit structure ranges from low to high values, respectively, and valve means movable toward the closed position in response to decrease in fuel pressure for interrupting the supply of fuel to said first manifold at a preselected fuel pressure value, said valve means being interposed in said conduit structure.

2. In combustion apparatus for an aircraft engine, tubular wall structure defining a combustion chamber having openings at opposite ends for flow of gases therethrough, fuel feeding structure including a first annular manifold and a second annular manifold of substantially equal diameters disposed adjacent each other and in mutual axial alignment, said first manifold being disposed upstream of said second manifold relative to the flow of said gases and having a plurality of fuel spray openings facing upstream, said second manifold having a plurality of fuel spray openings facing downstream, means including conduit structure for supplying fuel to said first and second manifolds in metered quantity ranging from low to high rates of fuel flow, whereby the fuel pressure in said conduit structure ranges from low to high values, respectively, and a pressure responsive valve movable toward the closed position in response to decrease in fuel pressure for interrupting the supply of fuel to said first manifold at a preselected fuel pressure value, said conduit structure including a main conduit, a first branch conduit connected to said first manifold and a second branch conduit connected to said second manifold, and said pressure responsive valve being interposed in said first branch conduit.

3. In combustion apparatus for an aircraft engine, tubular wall structure defining a combustion chamber having openings at opposite ends for flow of gases therethrough, fuel feeding structure including a first annular manifold and a second annular manifold of substantially equal diameters disposed adjacent each other and in mutual axial alignment, said first manifold being disposed upstream of said second manifold relative to the flow of said gases and having a plurality of fuel spray openings facing upstream, said second manifold having a plurality of fuel spray openings facing downstream, means including conduit structure for supplying fuel to said first and second manifolds in metered quantity ranging from low to high rates of fuel flow, whereby the fuel pressure in said conduit structure ranges from low to high values, respectively, valve means movable toward the closed position in response to decrease in fuel pressure for interrupting the supply of fuel to said first manifold at a preselected fuel pressure value, said valve means being interposed in said conduit structure, and flame-holding structure disposed downstream of said fuel feeding structure, said flame-holding structure being fixed for all operative fuel feeding conditions of said fuel feeding structure.

4. In combustion apparatus for an aircraft engine, tubular wall structure defining a combustion chamber having openings at opposite ends for flow of gases therethrough, fuel feeding structure including a first elongated tubular manifold and a second elongated tubular manifold of substantially equal length and similar shape disposed adjacent each other and in mutual axial alignment, said first manifold being disposed upstream of said second manifold relative to the flow of said gases and having a plurality of fuel spray openings facing upstream, said second manifold having a plurality of fuel spray openings facing downstream, means including conduit structure for supplying fuel to said first and second manifolds in metered quantity ranging from low to high values, respectively, and valve means movable toward the closed position in response to decrease in fuel pressure for interrupting the supply of fuel to said first manifold at a preselected fuel pressure value, said valve means being interposed in said conduit structure.

References Cited in the file of this patent

UNITED STATES PATENTS

| 2,508,420 | Redding | May 23, 1950 |
| 2,572,723 | Hildestad | Oct. 23, 1951 |
| 2,590,853 | Fulton | Apr. 1, 1952 |
| 2,616,254 | Mock | Nov. 4, 1952 |
| 2,651,178 | Williams | Sept. 8, 1953 |
| 2,781,638 | Fletcher et al. | Feb. 19, 1957 |